United States Patent
Kim et al.

(10) Patent No.: US 7,089,024 B2
(45) Date of Patent: Aug. 8, 2006

(54) MESSAGE TRANSMITTING METHOD USING SHORT MESSAGE SERVICE

(75) Inventors: Jin Il Kim, Seoul (KR); Young Jo Jeong, Seoul (KR)

(73) Assignee: LG Electronics Inc., Seoul (KR)

( * ) Notice: Subject to any disclaimer, the term of this patent is extended or adjusted under 35 U.S.C. 154(b) by 493 days.

(21) Appl. No.: 09/987,100

(22) Filed: Nov. 13, 2001

(65) Prior Publication Data

US 2002/0058522 A1  May 16, 2002

(30) Foreign Application Priority Data

Nov. 11, 2000  (KR)  ................................ 2000-66954

(51) Int. Cl.
*H04Q 7/20* (2006.01)
(52) U.S. Cl. ................ 455/466; 455/414.4; 455/414.3; 455/426.1; 455/428; 455/430; 370/328; 370/472; 370/349; 370/465; 370/476
(58) Field of Classification Search ................ 455/466, 455/414.1, 414.2, 414.3, 414.4, 430, 426.1, 455/428, 426, 427; 370/392, 471, 473, 328, 370/470, 472, 475, 349, 465, 476; 709/206
See application file for complete search history.

(56) References Cited

U.S. PATENT DOCUMENTS

| 5,673,259 | A  | * | 9/1997 | Quick, Jr. | .................... | 370/342 |
| 6,185,208 | B1 | * | 2/2001 | Liao | ........................... | 370/392 |
| 6,208,859 | B1 | * | 3/2001 | Halvorson | ................... | 455/430 |
| 6,597,918 | B1 | * | 7/2003 | Kim | .......................... | 455/466 |

* cited by examiner

*Primary Examiner*—Joseph Feild
*Assistant Examiner*—Randy Peaches
(74) *Attorney, Agent, or Firm*—Fleshner & Kim, LLP

(57) ABSTRACT

A message transmitting method using a short message service (SMS) that can successively transmit messages that a mobile terminal user intends to transmit. According to the long message transmitting method using the SMS, in case that the message to be transmitted exceeds a predetermined length, identifiers representing a boundary of each predetermined unit of the message and an identifier representing that the message is divided and transmitted are inserted into the units of the message, and the message is divided and transmitted according to the inserted identifiers.

20 Claims, 6 Drawing Sheets

MESSAGE TRANSMITTING METHOD USING SHORT MESSAGE SERVICE

BACKGROUND OF THE INVENTION

1. Field of the Invention

The present invention relates generally to the message transmission, and more particularly to a message transmitting method using a short message service that enables a mobile terminal user to successively transmit a message.

2. Background of the Related Art

As is well known, a short message service (SMS) is a service that enables a mobile station to exchange simple characters and figures with a base station or an external device capable of communicating with the base station. The mobile station supporting the SMS receives a data burst message and decodes the encoded message while it monitors a paging channel allocated to the corresponding mobile station.

In case that the mobile station is in an idle state, its access to the system function is limited, and in this state, the mobile station monitors the paging channel.

At this time, the base station transmits the paging message and SMS message to the mobile station through the paging channel. Also, the mobile station may transmit a limited SMS message to the base station using an access channel.

Generally, when the user intends to transmit a text message using the SMS, the length of the message is limited to only the length permitted by a communication service provider.

Accordingly, in case of transmitting a long message, it should be divided into a plurality of short messages, and the receiver's number and reply number should be selected for each short message.

Hereinafter, a conventional method of transmitting a long message using the SMS will be explained with reference to the accompanying drawings.

FIG. 1 is a flowchart illustrating the conventional method of transmitting a long message using the SMS.

Referring to FIG. 1, the user first selects a text message transmission menu of a mobile terminal (step S10).

After selecting the transmission menu (step S10), the user inputs a receiver's number to which the user intends to transmit the long message, and then inputs a reply number of the user (step S11).

After inputting the receiver's number and reply number (step S11), the user prepares the text message (step S12).

Here, the length of the prepared text message is limited to the number of characters permitted by the communication service provider, for example, within 80 bytes.

After preparing the text message (step S12), the user transmits the prepared text message to the inputted receiver's number (step S13).

After transmitting the text message (step S13), the user's mobile terminal waits for completion of transmission until the message transmission to the inputted receiver's number (step S14).

After waiting for the completion of transmission (step S14), the user judges whether there is any message to be transmitted in addition to the previously transmitted message (step S15).

If it is judged that there is the message to be additionally transmitted as a result of judgement (step S15), the user prepares and transmits to the receiver's number the additional message by repeating the above-described steps.

Meanwhile, if it is judged that there is no further message to be additionally transmitted as a result of judgement (step S15), the user terminates the transmission of the text message.

However, according to the conventional long message transmitting method using the SMS, the length of the text message is limited to the number of characters permitted by the service provider, i.e., within 80 bytes, and thus in order to transmit the message whose length exceeds 80 bytes, the message should be divided into several short messages. Also, the menu selection process, input of the receiver's name and reply number, and waiting for completion of text transmission should be repeated for each divided short message.

SUMMARY OF THE INVENTION

Accordingly, the present invention is directed to a message transmitting method of using the SMS that substantially obviates one or more problems due to limitations and disadvantages of the related art.

An object of the present invention is to provide a message transmitting method using the SMS that can transmit a long message at a time.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve this object and other advantages and in accordance with the purpose of the invention, as embodied and broadly described herein, a short message transmitting method in a communication system includes the steps of checking the number of characters of an input text message, inserting connection information representing a boundary of the text message and identification information for informing that the text message is divided whenever the checked number of characters exceeds a predetermined number, dividing the input text message according to the inserted connection information, and transmitting divided text messages.

Preferably, at the connection information insertion step, the connection information comprises first connection information for informing that there is the divided text message connected in rear of the connection information, and second connection information for informing there is the divided text message connected in front of the connection information.

At the identification information insertion step, the identification information includes information representing a division order of the input text message.

At this time, the first connection information is inserted into a start portion of the respective divided text message, and the second connection information is inserted into an end portion of the respective divided text message. Also, in case of the firstly divided text message among the divided text messages, the connection information is inserted into only an end portion of the firstly divided text message, and in case of the lastly divided text message among the divided text messages, the connection information is inserted into only a start portion of the lastly divided text message.

The divided text messages are transmitted through a paging channel.

Preferably, the transmitting step further includes the steps of checking the division order of the respective divided text messages, and successively transmitting the respective divided text messages according to the checked division order.

At this time, the information on the division order of the respective divided text messages is obtained by checking the inserted identification information.

After the transmitting step, the short message transmitting method may further includes the steps of checking whether the respective divided text messages are normally transmitted, and if it is checked that there is any text message not normally transmitted, re-transmitting the corresponding text message.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

According to the present invention, the message is divided in a predetermined length or capacity, for example, by 80 bytes. It is also possible to determine other lengths or capacities of division.

The transmission and/or reception of a short message is performed using a paging channel and traffic channel, and the short message is hereinafter considered in the unit of a block.

Data represents a long message to be transmitted at a time by a user's manipulation of a mobile terminal.

Figure 1:
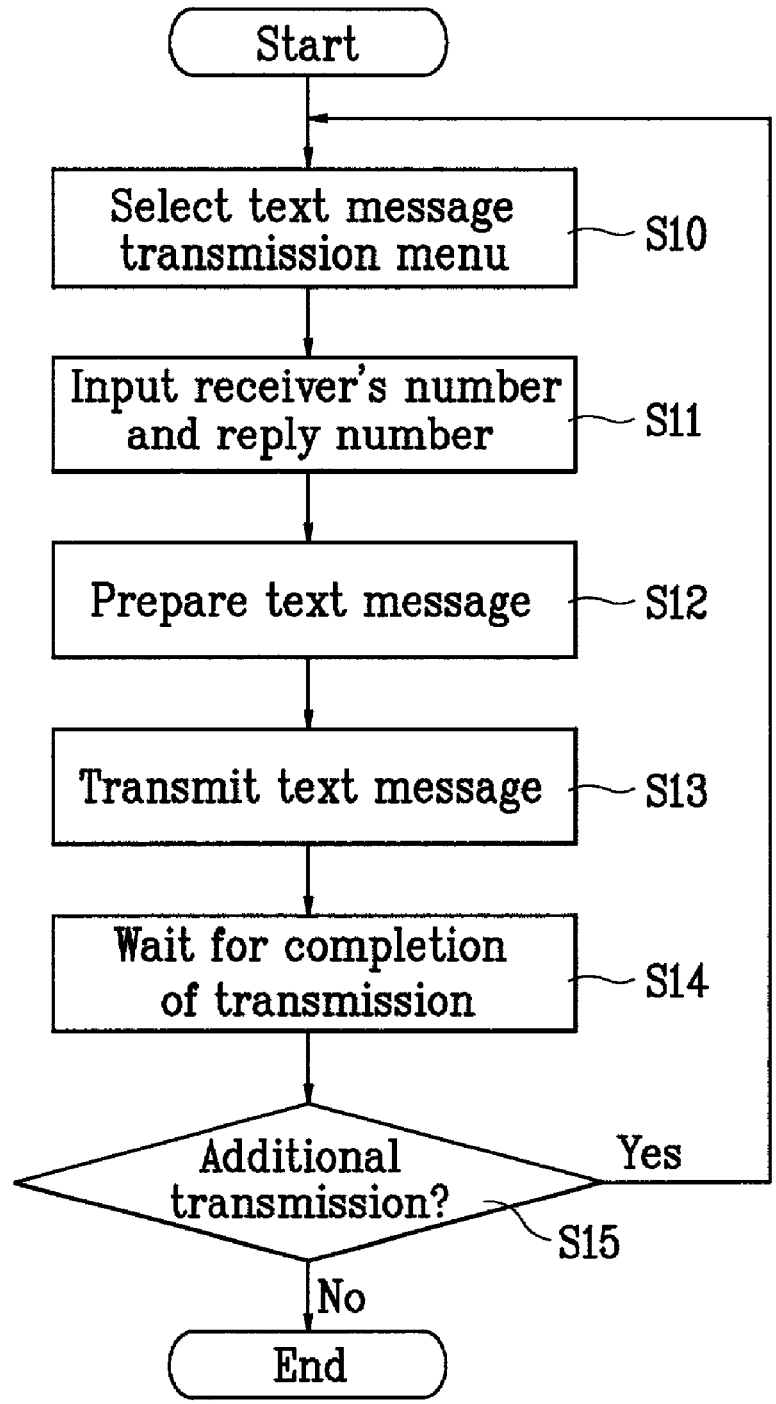
FIG. 1 is a flowchart illustrating a conventional long message transmitting method using the SMS.
Figure 2A:
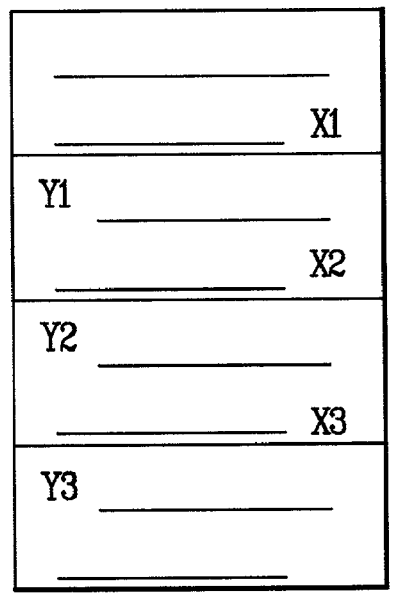
FIG. 2A is a view illustrating a long message prepared using the SMS according to a first embodiment of the present invention.

FIG. 2A is a view illustrating a long message prepared using the SMS according to a first embodiment of the present invention.

Referring to FIG. 2A, the length of a short message using the SMS is determined to be of 80 bytes, and the length of the text to be prepared by the user is of 300 bytes. 'X' denotes a connection code representing an end of a prepared short message of 80 bytes, and 'Y' denotes a connection code representing a start of the prepared short message.

The method of dividing the long message of 300 bytes prepared by the user into short messages of 80 bytes that can be transmitted using the SMS is as follows.

If the text composed of 80 bytes is first inputted by the user's manipulation of the terminal, a connection code X1 representing an end of the short message is attached to the short message. The connection code X1 is then connected to a connection code Y1 representing a start of a next short message. The short message of 80 bytes first inputted is called a block 1.

The connection code Y1 connected to the connection code X1 of the block 1 is attached to a start of another inputted short message (hereinafter, referred to as block 2) in the range of 81~160 bytes, and then a connection code X2 representing an end of the short message is attached to an end of the block 2.

Then, the connection code Y2 connected to the connection code X2 of the block 2 is attached to a start of still another inputted short message (hereinafter, referred to as block 3) in the range of 161~240 bytes, and then a connection code X3 representing an end of the short message is attached to an end of the block 3.

In the same manner, a connection code Y3 is attached to an end of a lastly inputted short message (hereinafter, referred to as block 4) in the range of 241~300 bytes, so that the long message of 300 bytes is divided into a predetermined number of short messages.

In other words, the message is processed in the unit of a block whenever it exceeds the capacity of text permitted by the communication service provider using the above-described connection codes, and the processed blocks are stored in an internal memory. The above-described connection codes are inserted into the end and the start of the respective successive block, respectively.

Figure 2B:
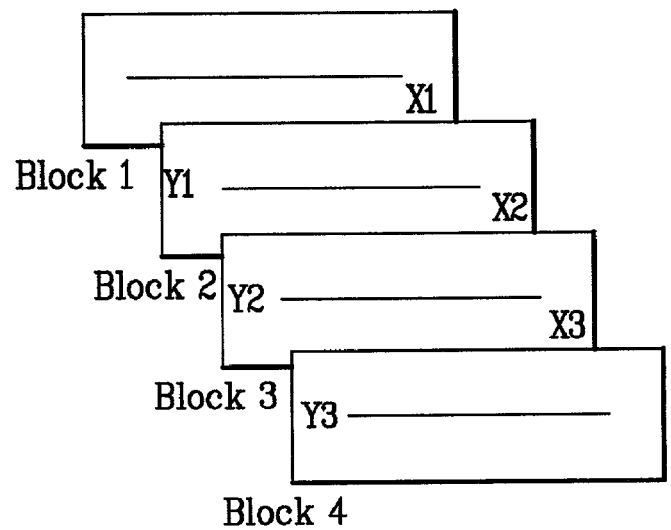
FIG. 2B is a view illustrating that the long message prepared as shown in FIG. 2A is divided into short messages.

FIG. 2B is a view illustrating that the long message prepared as shown in FIG. 2A is divided into short messages.

Referring to FIG. 2B, the long message of 300 bytes prepared as shown in FIG. 2A is divided into blocks according to the inserted connection codes.

Specifically, the data or long message to be transmitted at a time by the user's manipulation of the mobile terminal is divided into the block 1 in the range of 1~80 bytes, block 2 in the range of 81~160 bytes, block 3 in the range of 161~240 bytes, and block 4 in the range of 241~300 bytes which are connected in series by the connection codes.

Figure 2C:
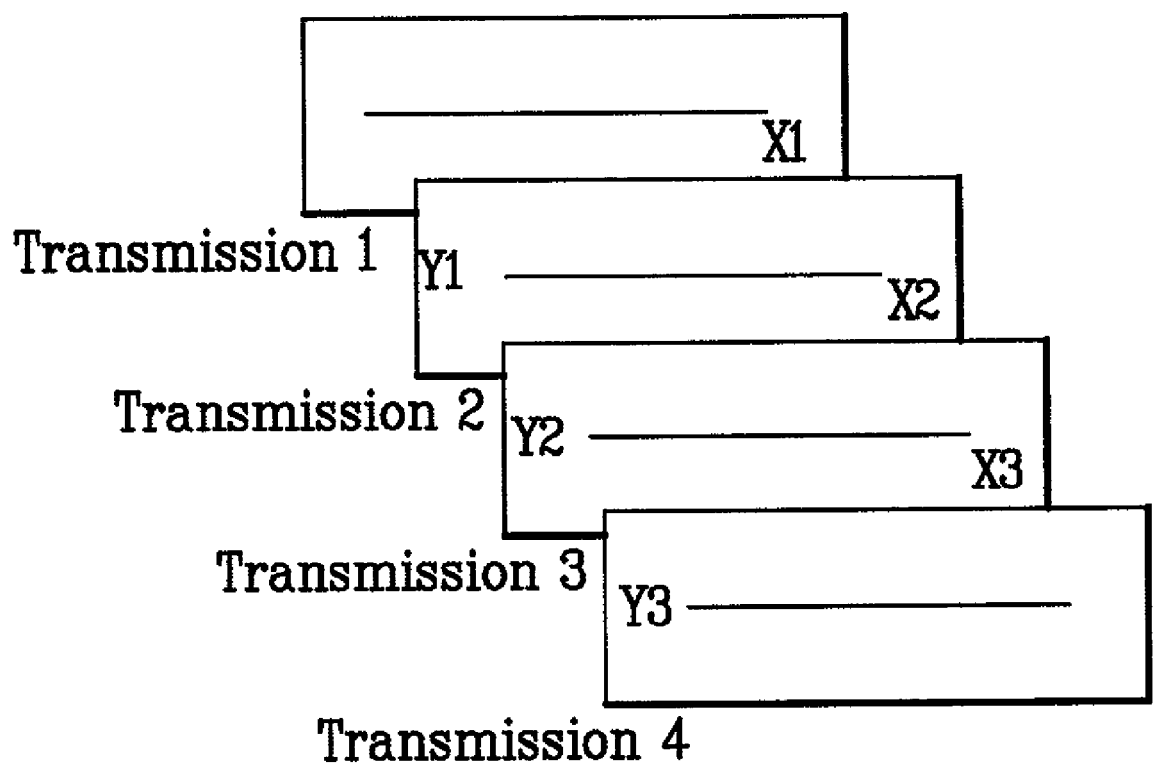
FIG. 2C is a view illustrating the transmission order of the divided short messages as shown in FIG. 2B.

FIG. 2C is a view illustrating the transmission order of the divided short messages as shown in FIG. 2B.

Referring to FIG. 2C, the blocks 1, 2, 3, and 4 divided as shown in FIG. 2B are transmitted to a receiving end through the traffic channel in the order of preparation.

Meanwhile, the short messages each of which corresponds to a block permitted as much as 80 bytes (corresponding to 40 Korean characters or 80 English characters or figures) may be transmitted through the paging channel.

Figure 3A:
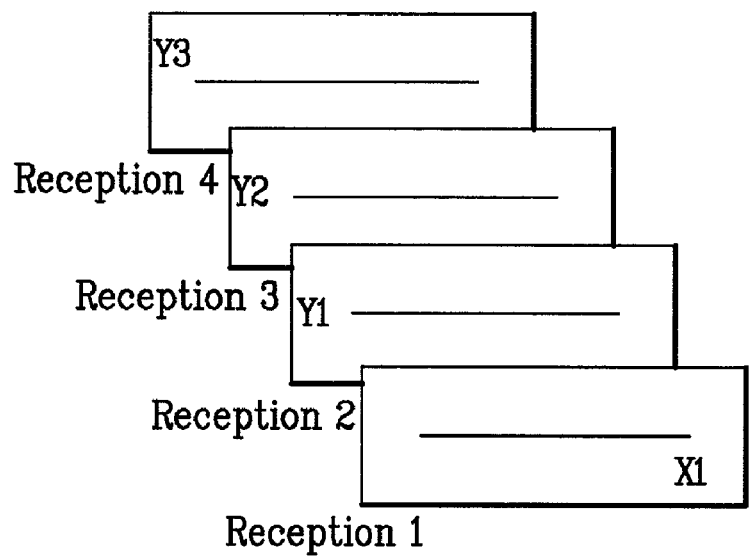
FIG. 3A is a view illustrating the received short messages transmitted as shown in FIG. 2C.

FIG. 3A is a view illustrating the received short messages transmitted as shown in FIG. 2C.

Referring to FIG. 3A, if the short messages produced as shown in FIG. 2C are transmitted to the receiving end, the receiving end confirms whether the transmitted messages are connected by the connection codes. At this time, the firstly transmitted message may be firstly received, and the lastly transmitted message may be firstly received. FIG. 3A shows an example that the short messages are received in the order of transmission. However, according to the present invention, it is assumed that the received short messages are combined in order according to the connection codes irrespective of the order of reception.

Figure 3B:
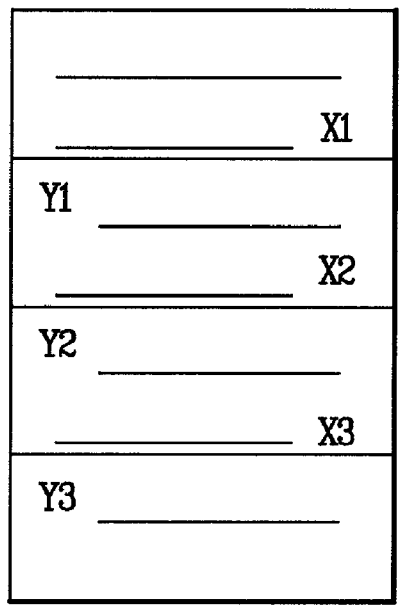
FIG. 3B is a view illustrating a message obtained by connecting and combining the short messages received as shown in FIG. 3A.

FIG. 3B is a view illustrating a message obtained by connecting and combining the short messages received as shown in FIG. 3A.

Referring to FIG. 3B, the receiving end produces a text message by combining the blocks 1 to 4 received as shown in FIG. 3A according to the connection codes.

The several short messages in the unit of a block are combined to produce a message, and the user can confirm the long message at first sight through a display window of the mobile terminal. Hereinafter, it is assumed that the length of the text message limited by the service provider is of 80 bytes.

Figure 4:
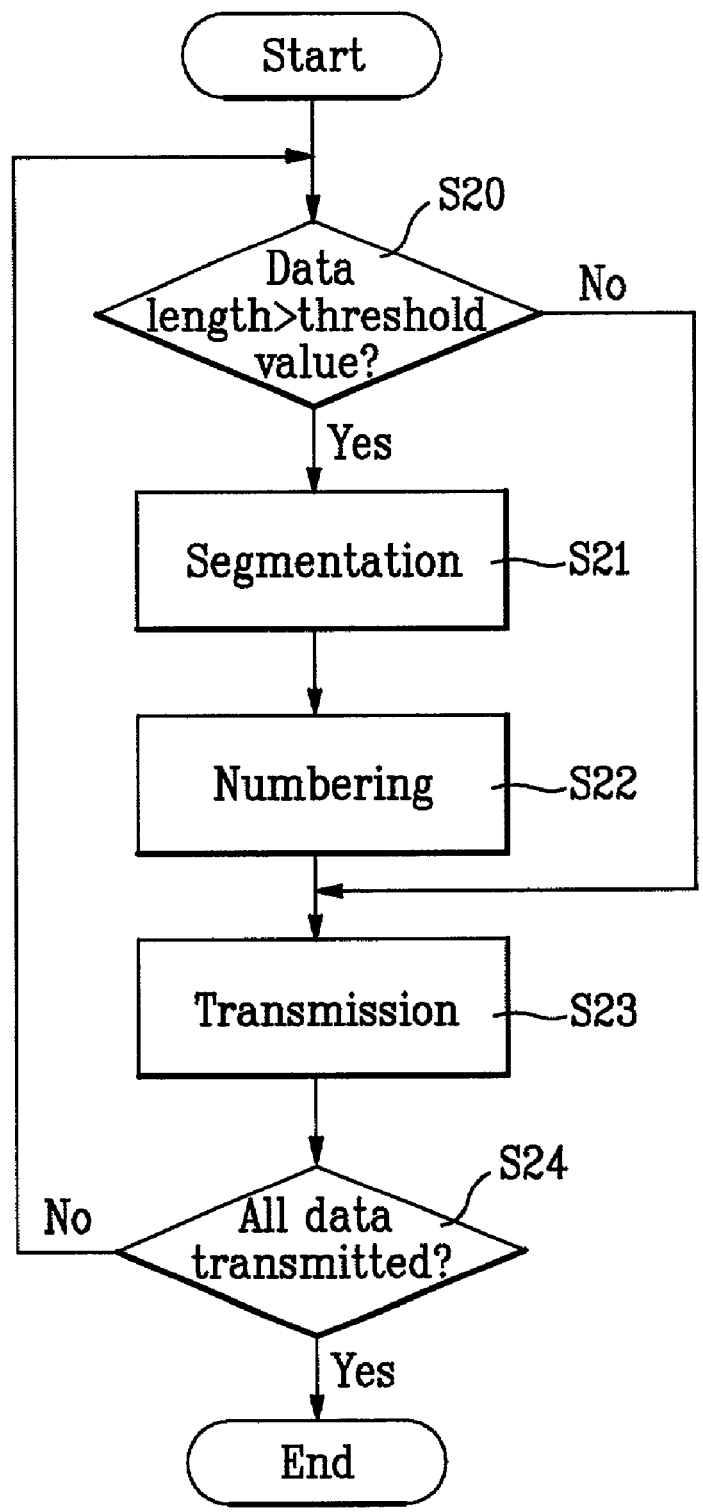
FIG. 4 is a flowchart illustrating a long message transmitting process using the SMS according to a second embodiment of the present invention.

FIG. 4 is a flowchart illustrating a long message transmitting process using the SMS according to a second embodiment of the present invention.

Referring to FIG. 4, the transmitting end first confirms whether the length of the data inputted by the user's manipulation is of 80 bytes (step S20).

If it is confirmed that the length of the data exceeds 80 bytes as a result of confirmation (step S20), the transmitting end divides the data of more than 80 bytes into blocks by segmentation in the unit of 80 bytes (step S21).

Then, the transmitting end numbers the divided blocks of 80 bytes (step S22).

For instance, in case that the data is prepared in Korean and has a length of 200 bytes, the 80-byte block in the range of 1~40 characters is numbered as number 1, the 80-byte block in the range of 41~80 characters is numbered as number 2, and the 40-bytes block in the range of 81~100 is numbered as number 3, respectively.

After transmitting the divided blocks to the receiving end, the transmitting end confirms whether all the blocks are transmitted (steps S23 and S24). At this time, the transmitting end may successively transmit the divided blocks in the order of numbering.

At this time, to the transmitted blocks is attached the type of SMS that can be recognized by the receiving end. This SMS type is for informing the receiving end that the message transmitted by the user is divided in the unit of a block.

If it is confirmed that all the data in the unit of a block has been transmitted (step S23), the data transmission is terminated.

However, if it is confirmed that all the data in the unit of a block has not yet been transmitted, the above processes (steps S20~S25) are repeated. That is, the text message is divided again, numbered, and then re-transmitted with the division information inserted thereto.

Meanwhile, if it is confirmed that the length of the data is less than 80 bytes as a result of confirmation (step S20), the transmitting end immediately transmits the data to the receiving end using the SMS without performing the segmentation (step S21) and numbering process (step S22).

Figure 5:
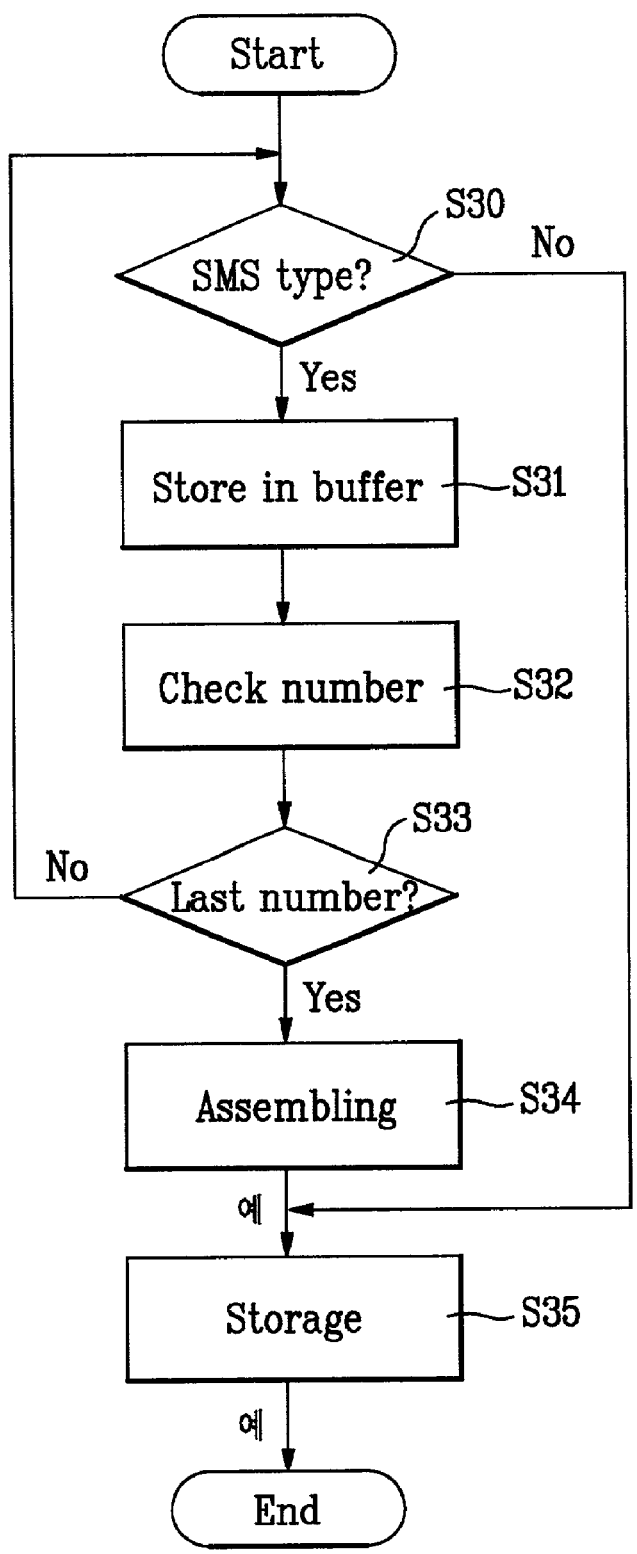
FIG. 5 is a flowchart illustrating a long message receiving process using the SMS according to the second embodiment of the present invention.

FIG. 5 is a flowchart illustrating a long message receiving process using the SMS according to the second embodiment of the present invention.

Referring to FIG. 5, the receiving end first confirms the SMS type, i.e., whether the data is received in the unit of a block (step S30).

If it is confirmed that the received data is the short messages in the unit of a block as a result of confirming the SMS type of the received data (step S30), the receiving end stores the data in a buffer (step S31).

After storing the short messages in the unit of a block in the buffer (step S31), the receiving end checks the number of the short messages in the unit of a block (step S32).

After checking the number of the short messages in the unit of a block (step S32), the receiving end judges whether the input number of the short message in the unit of a block is the last one (step S33).

At this time, the receiving end can judge the last short message by the connection code of the text message or the division information.

First, in case of the judgement by the connection code, the receiving end judges the text message is the last text message if the divided text message has no connection code connected to the end thereof, and judges the text message is the first message if the divided text message has no connection code connected to the start thereof.

The division information includes the identification information representing that the text message is divided, and the numbering information representing the division order of the text message.

Accordingly, the transmitting end may successively transmit the divided text messages by recognizing the identification information, and the receiving end may successively combine the received text messages by recognizing the identification information.

If it is judged that the number of the short message in the unit of a block is the last number (step S33), the receiving end assembles the firstly transmitted block to the lastly transmitted block (step S34).

Then the receiving end stores the assembled short messages in the buffer (step S36), and terminates the reception of the short messages in the unit of a block.

However, if it is judged that the number of the short message in the unit of a block is not the last number (step S33), the receiving end performs the process of judging the SMS type again (step S30).

By repeating the above processes, the short messages transmitted in the unit of a block from the transmitting end are assembled and stored in the buffer, processed in the same manner as the data received through the traffic channel, and then displayed as a message on the display window of the terminal.

Meanwhile, if it is confirmed that the received data is not the short messages in the unit of a block as a result of confirming the SMS type of the received data (step S30), the receiving end directly stores the transmitted data in the buffer (step S35).

As described above, according to the present invention, the long message prepared by the user as long as that desired by the user can be prepared and transmitted at a time irrespective of the text capacity limited by the communication service provider. Thus, any unreasonable work and waiting time are not required for transmitting the long message using the SMS.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A short message transmitting method in a communication system comprising:

checking a number of characters of an input text message;

inserting connection information representing a boundary of the text message and identification information for informing that the text message is divided whenever the checked number of characters exceeds a predetermined number;

dividing the input text message into a plurality of divided text messages according to the inserted connection information; and transmitting the divided text messages, wherein the connection information comprises first connection information for informing there is a respective divided text message connected to a rear of the first connection information, and second connection information for informing there is the respective divided text message connected to a front of the second connection information, the first connection information also for informing a connection of the respective divided text message with another one of the divided text messages and the second connection information also for informing a connection of the respective divided text message with a further one of the divided text messages, wherein for a first divided text message among the divided text messages, the connection information is inserted into only an end portion of the first divided text message, the end portion being an end to be connected to a next divided text message.

2. The method as claimed in claim 1, wherein the identification information includes information representing a division order of the input text message.

3. The method as claimed in claim 1, wherein the first connection information is inserted into a start portion of the respective divided text message, and the second connection information is inserted into an end portion of the respective divided text message.

4. A short message transmitting method in a communication system comprising:

checking a number of characters of an input text message;

inserting connection information representing a boundary of the text message and identification information for informing that the text message is divided whenever the checked number of characters exceeds a predetermined number;

dividing the input text message into a plurality of divided text messages according to the inserted connection information; and transmitting the divided text messages, wherein the connection information comprises first connection information representing that there is one divided text message connected to a rear of the first connection information, and second connection information representing that there is the one divided text message connected to a front of the second connection information, the first connection information representing a connection of the one divided text message with another one of the divided text messages and the second connection information representing a connection of the one divided text message with a further one of the divided text messages, wherein Only a last divided text message among the divided text messages has the connection information inserted into only a start portion of the last divided text message.

5. The method as claimed in claim 1, wherein the divided text messages are transmitted through a paging channel.

6. The method as claimed in claim 1, wherein transmitting the divided text messages comprises:

checking a divided order of respective divided text messages; and successively transmitting the respective divided text messages according to the checked divided order.

7. The method as claimed in claim 6, wherein information on the division order of the respective divided text messages is obtained by checking the inserted identification information.

8. The method as claimed in claim 1, further comprising:

after transmitting the divided text messages, checking whether respective divided text messages are normally transmitted; and if it is checked that there is any text message not normally transmitted, re-transmitting the respective text message.

9. A short message receiving method in a communication system comprising:

receiving text messages transmitted through a radio channel;

checking whether the received text messages are divided text messages by analyzing identification and connection information of the received text messages;

if it is checked that the received text messages are divided text messages, storing the received text messages in a memory; and displaying the text messages stored in the memory, wherein no connection information at a start of a respective divided text message indicates the respective divided text message is a first divided text message and no connection information at an end portion of the respective divided text message indicates the respective text message is a last divided text message, wherein the connection information comprises first connection information to inform that there is a respective divided text message connected to a rear of the first connection information, and second connection information to inform that there is the respective divided text message connected to a front of the second connection information, the first connection information to inform a connection of the respective divided text message with a previous one of the divided text messages and the second connection information to inform a connection of the respective divided text message with a subsequent one of the divided text messages.

10. The method as claimed in claim 9, wherein displaying the text messages comprises:

checking the identification information of the respective stored text messages; and successively displaying respective stored text messages according to division order information of the respective stored text messages included in the identification information.

11. A short message transmitting/receiving method in a communication system comprising:

a transmitting end producing a message to be transmitted;

a receiving end inserting identification information representing that the message is divided and inserting connection information representing a boundary of the divided message, when the message to be transmitted exceeds a predetermined length;

segmenting the message according to the inserted connection and identification information;

numbering and transmitting the divided messages to the transmitting end; and the receiving end assembling the transmitted divided messages into a message according to the connection and identification information and displaying the assembled message, wherein a respective divided message that does not include inserted connection information in a first position of the respective divided message is a first divided message and a respective divided message that does not include inserted connection information in an end position of the respective divided message is a last divided message, wherein the connection information comprises first connection information for informing there is a respective divided message connected to a rear of the first connection information, and second connection information for informing there is the respective divided message connected to a front of the second connection information, the first connection information also for informing a connection of die respective divided text message with another one of the divided messages and the second connection information also for informing a connection of the respective divided text message with a further one of the divided messages.

12. The method as claimed in claim 11, wherein assembling the message comprises:
   temporarily storing the transmitted unit messages;
   assembling the messages according to a numbering order of the stored unit messages and the connection information; and
   displaying the assembled message.

13. The method as claimed in claim 11, wherein the divided messages are transmitted through a paging channel.

14. The method as claimed in claim 11, wherein connection information inserted into only the last position of the divided message indicates the divided message is the first divided message.

15. The method as claimed in claim 11, wherein connection information inserted into only the start position of the divided message indicates the divided message is the last divided message.

16. A short message communication method comprising:
   segmenting a message that is longer than a predetermined length into a plurality of divided messages;
   inserting an end connection code at an end position of a respective divided message to indicate an end of the respective divided message and that another divided message follows the respective divided message; and
   inserting a start connection code at a start position of the respective divided message to indicate a start of the respective divided message and that a further divided message precedes the respective divided message.

17. The method as claimed in claim 16, wherein the start connection code is inserted at a first position of the respective divided message only for a last divided message.

18. The method as claimed in claim 16, wherein the start connection code is inserted at a first position of a respective divided message only for divided messages that occur after a first divided message.

19. The method as claimed in claim 16, wherein the end connection code is inserted only for a first divided message.

20. The method as claimed in claim 4, wherein the start portion of the last divided text message to be connected to an end portion of an immediately preceding divided text message.

* * * * *